United States Patent [19]
Smith

[11] Patent Number: 5,234,194
[45] Date of Patent: Aug. 10, 1993

[54] SEAL FOR A SHAFT

[76] Inventor: Russell G. Smith, 880 Rue de la Paix, Cincinnati, Ohio 45220

[21] Appl. No.: 585,295

[22] Filed: Sep. 19, 1990

[51] Int. Cl.$^5$ ............................................. F16K 41/04
[52] U.S. Cl. .................................. 251/214; 251/309; 277/105; 277/125; 277/208
[58] Field of Search ............... 251/214, 309, 312, 313, 251/335.2; 137/375; 277/105, 200, 213, 189, 207 A, 208, 121, 123, 125, 210

[56] References Cited

U.S. PATENT DOCUMENTS

| | | | |
|---|---|---|---|
| 2,945,668 | 7/1960 | Staller et al. | 251/181 |
| 3,048,362 | 8/1962 | Scarborough | 251/214 |
| 3,119,624 | 1/1964 | Freed | 277/208 |
| 3,183,009 | 5/1965 | Kunel | 277/208 |
| 3,403,917 | 10/1968 | MacSpadden, Jr. | 277/200 |
| 3,702,193 | 11/1972 | Flegel et al. | 277/207 A |
| 4,159,818 | 7/1979 | Hoos | 251/214 |
| 4,285,498 | 8/1981 | Nightingale | 251/214 |
| 4,333,632 | 6/1982 | Smith | 251/335.2 |
| 4,429,886 | 2/1984 | Buttner | 277/207 A |
| 4,475,712 | 10/1984 | DeJager | 251/214 |
| 4,512,586 | 4/1985 | Smith | 277/105 |
| 4,695,061 | 9/1987 | Meisner et al. | 277/208 |
| 4,744,571 | 5/1988 | Geberth, Jr. | 277/208 |
| 4,865,170 | 9/1989 | Ciepichal | 277/208 |
| 5,020,810 | 6/1991 | Jobe | 277/207 A |

FOREIGN PATENT DOCUMENTS 219326  7/1924  United Kingdom ............... 277/189

Primary Examiner—George L. Walton
Attorney, Agent, or Firm—Frost & Jacobs

[57] ABSTRACT

A seal for a shaft in a structural body. The seal is configured to surround the shaft within said structural body. The seal has a flange making a gasket seal with the structural body. The seal has at least one portion distorted and stretched into a tapered configuration and into a tension-related sealing association with the shaft. The seal is made of a memory-retainable material. This memory urges the distorted and stretched tapered portion towards its original configuration, thereby enhancing the sealing association with the shaft.

29 Claims, 7 Drawing Sheets

SEAL FOR A SHAFT

TECHNICAL FIELD

The invention relates to sealing means for a shaft in a structural body, and more particularly to such a sealing means made from a memory retainable material; forming a gasket seal between itself and the structural body; and having at least one surface distorted and stretched into a tapered configuration and a tension-related sealing association with the shaft, enhanced by the memory of the seal material.

BACKGROUND ART

It is common prior art practice to seal a shaft with a packing arrangement formed by a plurality of stacked V-shaped rings. The V-shaped rings are generally disposed in the packing chamber of a structural body in a circumferentially sealing relationship tot he shaft. Follower rings (also known as adaptor assemblies) are typically employed with the V-shaped rings and are positioned on opposite axial sides of the V-shaped rings. The externally positioned follower ring is urged into axially compressive engagement with the stacked V-shaped rings by a packing gland, with the internally positioned follower rings restrained from axial movement by the bottom of the packing chamber. Axial compression of the V-shaped ring stack tends to radially expand the rings and to assist in maintaining a sealing relationship between the V-shaped rings and the shaft.

Such V-shaped rings have been formed from a wide variety of materials. For example, elastomeric V-shaped rings formed from homogeneous rubbers have been used in many applications where relatively low pressures are encountered and where the fluid media involved does not damage the rubber. Fabric V-shaped rings coated with elastomers are often used on heavy duty equipment or when higher pressures are encountered. When corrosive media is handled, however, the corrosive media will often attack both the rubber and the fabric rings, making them unsuitable for commercial use. Under such conditions, prior art workers have used V-shaped rings of a molded fluoronated hydrocarbon polymer, such as polytetrafluoroethylene. Many fluoronated hydrocarbon polymers, such as polytetrafluoroethylene, are inert to virtually all chemical media and are suitable for use with a wide variety of corrosive fluids. In addition, fluoronated hydrocarbon polymeric V-shaped rings operate successfully through a wide range of temperatures, from approximately −120° F. to about 350° F. Many of the fluoronated hydrocarbon polymers are characterized by extremely low coefficience of friction.

A problem arises form the fact that fluoronated hydrocarbon polymers have a high coefficient of expansion relative to most metals. In addition, when cooled after exposure to elevated temperatures, fluoronated hydrocarbon polymers may shrink to a size which is smaller than their original size. As a result, even when prior art polytetrafluoroethylene packing rings are initially compressed tightly in sealing relationship about a metal shaft in a metal structural body, the sealing relationship may be lost if the system is thermally cycled.

Prior art polytetrafluoroethylene seals have been formed to the desired V-shaped configuration by compressive molding techniques. Such molding techniques, however, require the rings to have a minimum thickness of about ⅛ inch. This thickness requirement, when the rings are stacked in a packing arrangement, limits the minimum stack height requirement and thus limits the number of independent sealing surfaces acting on the shaft and packing chamber sidewall. Furthermore, compressively molded rings are permanently shaped and normally are compressed to form sealing surfaces with the shaft and packing chamber sidewalls.

U.S. Pat. No. 4,512,586 addressed these problems by forming a plurality of packing rings from memory retainable polytetrafluoroethylene. The rings are initially flat and are given a pre-formed V-shaped cross-sectional configuration in a forming dye. The pre-formed V-shaped rings are disposed in aligned relationship in the packing chamber between the cylindrical sidewall thereof and the shaft with the packing ring sidewalls compressed toward each other beyond the pre-formed V-shaped configuration. The memory retainable material is operative to urge the rings toward their original horizontal configuration whereby the sealing relationship between the cylindrical sidewall of the packing chamber and the shaft is enhanced, and is maintained despite thermocycling.

While such dye formed rings, taking advantage of the memory retainable material from which they are made, represent an improvement in the art, it has been found that whenever leakage did occur, it most often occurred between the rings and the cylindrical sidewall of the packing chamber. It has further been found that the memory of most fluoronated hydrocarbon polymers is very good in tension, but not as good in compression.

U.S. Pat. No. 4,333,632 teaches a sealing assembly comprising a plastic diaphragm, a delta ring, a metal diaphragm, and a floating thrust collar. The plastic diaphragm is made of a fluorinated hydrocarbon polymer and has a preformed tapered sealing lip which is deformed into a substantially cylindrical shape by the shaft and delta ring with which it makes a seal. While the seal disclosed in this patent has some tension sealing, the seal area is relatively wide and the seal is basically a compressive seal.

The present invention teaches sealing means made of memory retainable fluoronated hydrocarbon polymer and configured to prevent leakage between the sealing means and the surrounding body by means of a gasket seal. The sealing means of the present invention also provides at least one surface which is distorted and stretched into a tapered configuration and into a tension-related sealing association with the shaft. This tension-related narrow sealing surface is enhanced by the memory of the material of which the sealing means is made and is further enhanced by the pressure of the media. A sealing relationship with the shaft is maintained even in a system subject to thermocycling. It has also been found that when the shaft shifts with respect to the surrounding body due to the media pressure, resulting in misalignment, a tension seal flexes and maintains its seal, while a compression seal would not.

DISCLOSURE OF THE INVENTION

According to the invention there is provided a seal for a shaft in a structural body. The seal is made of memory retainable material and surrounds the shaft, being located between the shaft and the structural body. The seal is configured to form a gasket seal with the structural body. The seal is provided with at least one surface which is distorted and stretched into a tapered configuration and into a tension-related sealing association with the shaft. This tension-related sealing association is further enhanced by the memory of the material from which the seal is made.

In one embodiment of the seal of the present invention, the seal is initially a cylindrical member having an exterior peripheral flange which forms a gasket seal with a shoulder of the shaft-surrounding structural body. The shaft is mounted in the cylindrical seal with a minimal clearance there between. The shaft has an outwardly flared or tapered portion which, when forced into the cylindrical seal, causes a portion of the cylindrical seal to assume a corresponding flare or taper. The tapered portion of the seal is distorted and stretched into a tension-related sealing association with the shaft. This sealing association is enhanced by the memory characteristics of the seal material which urges the tapered portion of the seal toward its original cylindrical configuration.

A second embodiment of the seal of the present invention comprises a cylindrical member of memory retainable material. The second embodiment has an external peripheral flange which forms a gasket seal with the shaft-surrounding structural body. The inside surface of the cylindrical seal is provided with a plurality of horizontal inwardly extending lips in parallel spaced relationship. The free edges of the lips define a central bore of the cylindrical seal which is of lesser diameter than the diameter of the shaft. The shaft is inserted into the seal with special tooling. This causes the sealing lips to be distorted and stretched into a tapered configuration so as to lie at an angle of about 45° to their original horizontal configuration. This again produces for each lip a narrow tension-related sealing association with the shaft which is enhanced by the memory characteristic of the seal material constantly urging the lip toward its original horizontal configuration.

The seals of the present invention are characterized by a low coefficient of friction and are inert to virtually all chemical media. Their sealing relationship with the shaft and the shaft-surrounding structural body is maintained even if the system is thermally cycled. The seals of the present invention may be used individually or in combination. The seals may also be used in combination with a lantern gland, as will be described hereinafter.

While the seals of the present invention may be used in substantially any situation involving a shaft within a surrounding body, for purposes of an exemplary showing they will be described in their application to the actuating shaft of a plug valve. This application of the seals is exemplary only, and is not intended to be limiting. The description which follows sets forth a preferred embodiment of this invention, simply by way of illustration of one of the best modes contemplated for carrying out the invention. It will be apparent that the invention is capable of other different embodiments, and its several details are capable of modifications in various, obvious aspects all without departing from the spirit of the invention. Accordingly, the drawings and descriptions will be regarded as illustrative in nature and not as restrictive.

DETAILED DESCRIPTION OF THE PREFERRED EMBODIMENTS

Figure 1:
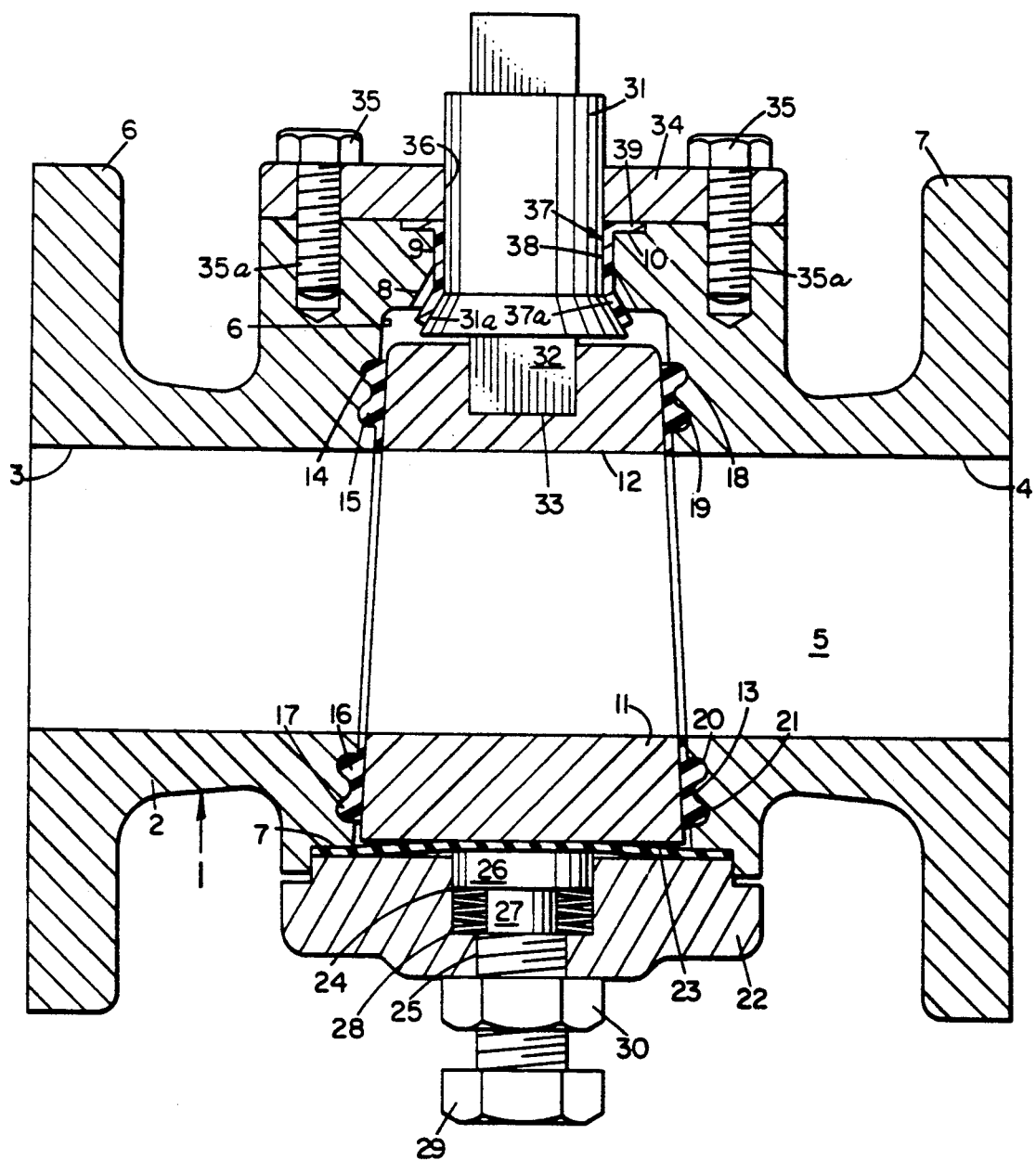
FIG. 1 is a cross-sectional elevational view of an exemplary plug valve, the actuating shaft of which is provided with a first embodiment of the seal of the present invention.

Reference is first made to FIG. 1 which illustrates a substantially conventional plug valve provided with a first embodiment of the seal of the present invention. The plug valve is generally indicated at 1 and comprises a body 2. The body 2 is provided with an inlet 3 and an outlet 4 with an internal fluid flow passage 5 extending therebetween. The inlet 3 and the outlet 4 are surrounded by flanges 6 and 7, respectively, by which the body 2 may be connected between similarly flanged conduits (not shown) by appropriate fastening means such as bolts or the like (not shown).

Between its inlet 3 and its outlet 4 the valve body 2 has a tapered valve chamber 6. At its lower end (as viewed in FIG. 1) the valve chamber 6 is open and is surrounded by an annular inset shoulder 7. At its upper end, the valve chamber 6 terminates in a tapered passage 8, leading to a cylindrical passage 9 to the exterior of the valve body. The cylindrical passage 9 is also surrounded by an inset shoulder 10.

The valve chamber 6 is adapted to receive a tapered plug 11. It will be noted that the valve chamber 6 and the plug valve 11 extend transversely of and intersect the inner flow passage 5 of the valve body 1. The plug valve 11 has a transverse passage 12. The plug valve 11 is rotatable within valve chamber 6. In one rotative position, the valve passage 12 is aligned with the fluid flow passage 5 of the valve body, allowing fluid flow therethrough. When the plug valve 11 is rotated 90° from the position shown in FIG. 1, its passage 12 will be out of registry with the valve body flow passage 5, effectively closing the valve body passage 5 and precluding fluid flow therethrough. The plug valve sleeve 13 is preferably formed of a plastic material such as fluorinated hydrocarbon or other material inert to process media flowing through the valve. The sleeve 13 has pairs of annular ribs 14-15 and 16-17 formed at its ends and received within annular grooves 18-19 and 20-21 formed in valve body 1. The sleeve 13 is appertured in correspondency with the plug valve 11 so as to permit fluid flow therethrough when the plug valve passage 12 is in registry with the valve body flow passage 5.

The lower end of the valve chamber 6 is closed by a closure cap 22 affixed to valve body 1 by a plurality of bolts (not shown). A resilient diaphragm-like gasket 23 is provided. The periphery of diaphragm 23 forms a gasket seal between the valve body shoulder 7 and cap 22. Centrally of cap 22 there is a bore having a first portion 24 of large diameter and a second threaded portion 25 of smaller diameter. Bore portion 24 contains a plunger 26 having a stem 27 surrounded by Bellville springs 28. The Bellville springs 28 bias the plunger 26 against the diaphragm 23 and the lower end of plug valve 11 to constantly urge the plug valve to its fully seated position within valve chamber 6. The threaded bore portion 25 is adapted to receive a bolt 29 having a lock washer 30. The bolt 29 adjusts the position of plunger 26.

The plug valve 11 is rotated between its open and closed positions by an actuating shaft 31. Actuating shaft 31 terminates at its lower end (as viewed in FIG. 1) in a non-circular stud 32 received within a correspondingly shaped socket 33 formed in the upper end of plug valve 11. The actuating shaft 31 extends through tapered passage 8 and cylindrical passage 9. The upper end of the valve body is provided with a closure cap 34 affixed to the valve body by a plurality of bolts, two of which are shown at 35, threadedly engaged in bores 35a. Closure cap 34 has a central bore 36 formed therein to just nicely receive actuating shaft 31. It will be understood that the free end of actuating shaft 31 may be attached to any appropriate actuating means (not shown) such as a manually rotated wheel or lever, or to the shaft of an appropriate prime mover.

The first embodiment of the seal of the present invention is generally indicated at 37 in FIG. 1. The seal 37 is made of a memory retainable material capable of withstanding temperatures in the range of from about 350° F. to about −120° F. Preferably, the seal 37 is a molded or machined fluorinated hydrocarbon polymer, such as polytetraflouroethylene. Polytetrafluoroethylene has a number of advantages. For example, it is inert to virtually all chemical media and is suitable for use with a very wide range of corrosive fluids. Furthermore, polytetrafluoroethylene, like many fluorinated hydrocarbon polymers, has an extremely low coefficient of friction. As initially molded or machined, the seal 37 has a cylindrical body 38 terminating at one end in a radial flange 39.

It will be noted that the lower end of the main body portion of actuating shaft 31 is flared or tapered, as at 31a. As the actuating shaft 31 is inserted through seal 37, it causes the lower portion 37a of the seal to be distorted and tapered to conform to the tapered portion 31a of actuating shaft 31. The flange 39 of seal 37 is located on shoulder 10. The flange 39 has a thickness dimension slightly greater than the dimension by which shoulder 10 is inset. As a consequence, the flange 39 is compressed when closure plate 34 is mounted on valve body 2 creating a gasket seal. This gasket seal will preclude leakage of fluid along the outside surface of seal 37.

It has been found that the memory of polytetrafluoroethylene and most other fluorinated hydrocarbon polymers is greater in tension than in compression. The distortion of the tapered portion 37a of seal 37 places that portion in tension. Thus, the tapered seal portion 37a is urged tightly against the tapered portion 31a of shaft 31. This is enhanced by the fact that the memory of the seal material seeks to return the tapered seal portion 31a to its original cylindrical configuration. Finally, fluid under pressure between tapered valve body passage 8 and the adjacent tapered portion 31a of seal 37 will also urge the seal tightly against actuating shaft 31.

Fluorinated hydrocarbon polymers have a high coefficient of expansion relative to most metals (about ten times that of the expansion of metal). Further, when cooled after exposure to elevated temperatures, fluorinated hydrocarbon polymers may shrink to a size which is smaller than their original size. In this instance, however, the sealing relationship will not be lost, even if the system is thermally cycled. This is true because the gasket seal of the flange 39 will preclude the leakage of fluid along the outside of seal 37. Both the memory of the seal material and the pressure of fluid against the outside of the tapered seal portion 37a will assure that the seal will be maintained against actuating shaft 31.

As is illustrated in FIG. 1, according to the present invention a standard valve can be furnished with a single seal which, under most circumstances, will suffice. However, when the valve is subjected to severe service (a highly corrosive fluid and/or high pressure and/or severe thermocycling) a second seal can be added to the same valve. The second seal comprises a very specialized packing, next to be described.

Figure 2:
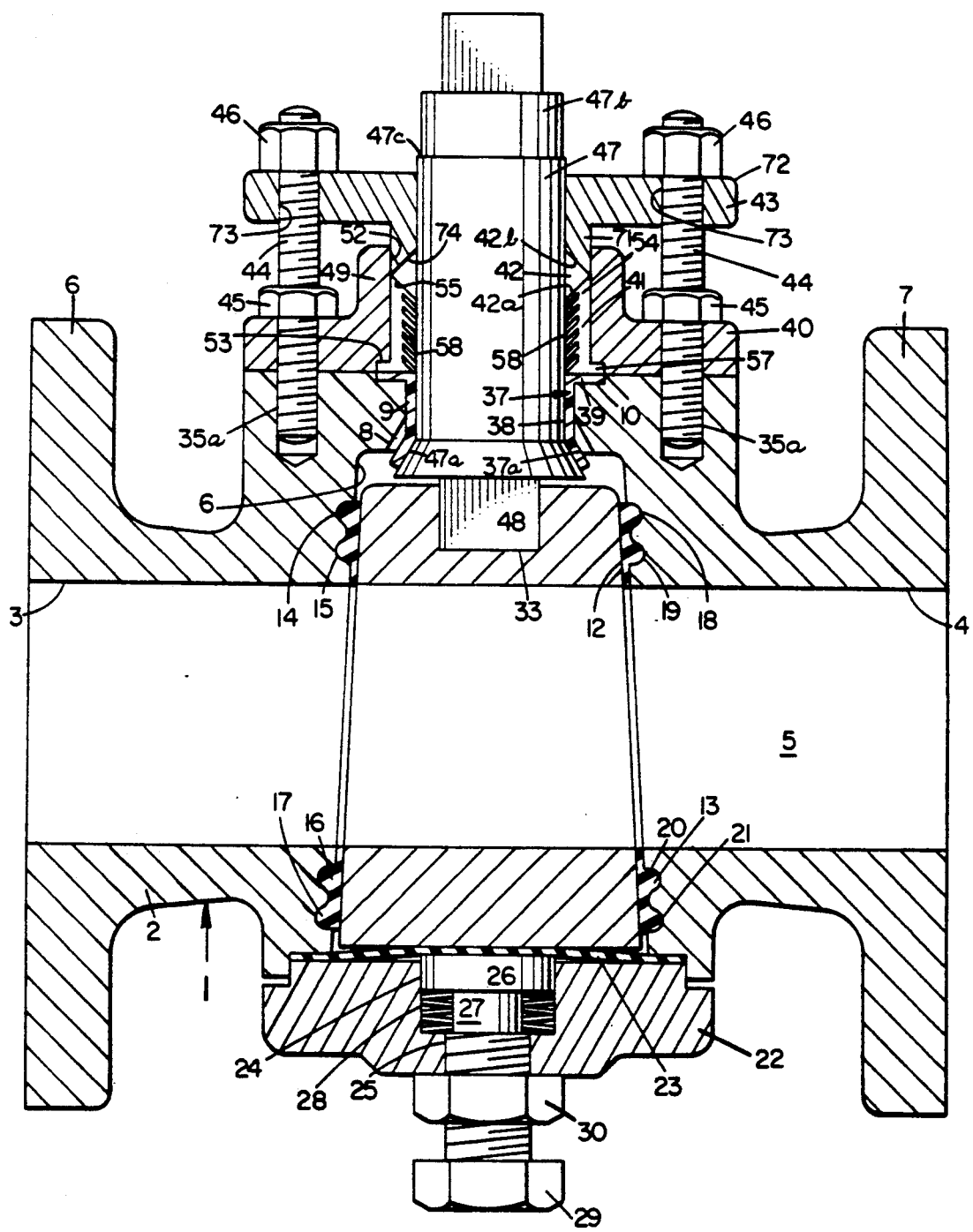
FIG. 2 is a cross-sectional view similar to FIG. 1 and illustrating the plug valve provided with the first embodiment of the seal of the present invention together with a second embodiment of the seal of the present invention located in a packing chamber provided with a follower ring and a gland.

Reference is made to FIG. 2 wherein the valve of FIG. 1 is illustrated with appropriate modifications to add the second seal. For this reason, like parts have been given like index numerals.

In FIG. 2, closure plate 34 has been replaced by a packing chamber 40 containing the second seal 41 and an adaptor assembly or follower ring 42. The packing chamber 40 is provided with a gland 43 and the bolts 35 have been replaced by threaded members 44, each provided with a pair of nuts 45 and 46. Each of these elements will be further described hereinafter.

In FIG. 1, actuating shaft 31 is illustrated as being rather short. If required, the actuating shaft 31 can be replaced by an actuating shaft 47. Actuating shaft 47 is identical to actuating shaft 31 with the exception that it is of greater length. Thus, actuating shaft 47 has a flared portion 47a equivalent to the flared portion 31a of shaft 31 and a non-circular stud 48 equivalent to the stud 32 of shaft 31 and receivable in the correspondingly shaped socket 33 formed in the upper end of plug valve 11. It will be understood that if actuating shaft 31 of FIG. 1 had been of sufficient length, then its replacement would not have been necessary.

Figure 3:
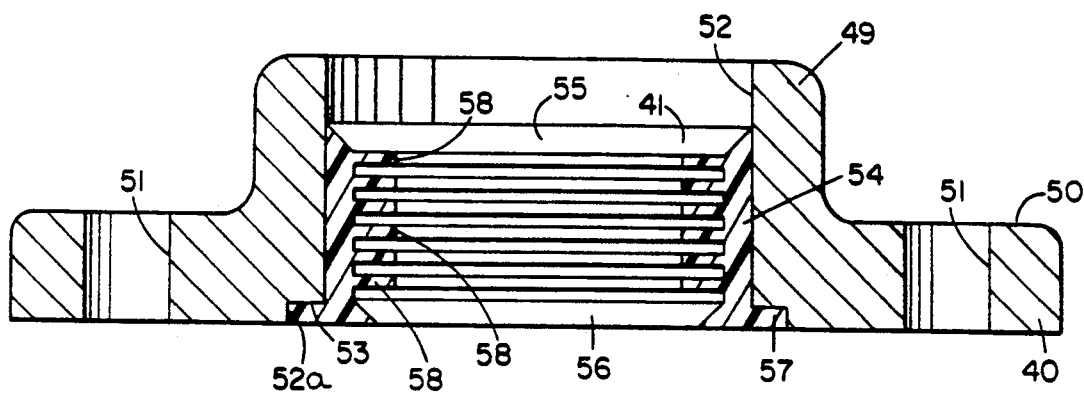
FIG. 3 is a cross-sectional elevational view illustrating the second seal embodiment of the present invention initially mounted in the packing chamber.

FIG. 3 illustrates the packing chamber 40 and the second seal 41. The packing chamber 40 comprises a cylindrical body 49 having an annular, radial flange 50. The flange 50 is provided with a plurality of bores 51 adapted to accommodate the threaded members 44 (see FIG. 2).

The cylindrical body 49 of packing chamber 40 has a central bore 52. At its lowermost end (as viewed in FIG. 3) the bore 52 is enlarged as at 52a to form an annular shoulder 53.

The second seal 41 is molded or machined of a fluorinated hydrocarbon polymer such as polytetrafluoroethylene, having the same properties as described with respect to the first seal 37. In FIG. 3, the second seal 41 is illustrated in its as molded or machined condition. The second seal 41 comprises a cylindrical body 54 terminating at its upper end (as viewed in FIG. 3) in a tapered surface 55 extending downwardly and inwardly at an angle of about 45°. At its lower end, the body 54 is provided with an internal tapered flange 56, again sloping downwardly and inwardly at an angle of about 45°. At its lower end, the second seal body 54 is provided with an exterior radial annular flange 57.

The second seal 41 is completed by the provision on the inside surface of its body 54 of a plurality of annular, horizontally oriented, thin flanges 58. The flanges 58 constitute sealing lips. They are in parallel spaced relationship with respect to each other and constitute an integral, one-piece part of the second seal 41. The free annular edges of sealing lips 58 define a central bore in the second seal 41 having a diameter less than the diameter of actuating shaft 47.

The manner in which the second seal 41 and the packing chamber 40 are assembled on the valve 1 will now be described. Referring first to FIG. 3, the body portion 54 of second seal 41 is so sized as to be compressed within the packing chamber bore 52. It will be noted from FIG. 3 that the peripheral flange 57 of second seal 41 is received in the larger diameter bore portion 52a of packing chamber 40 and rests upon shoulder 53. The flange 57 of second seal 41 has a thickness dimension just slightly greater than the dimension by which shoulder 53 is inset from the bottom surface of packing chamber 40.

Figure 4:
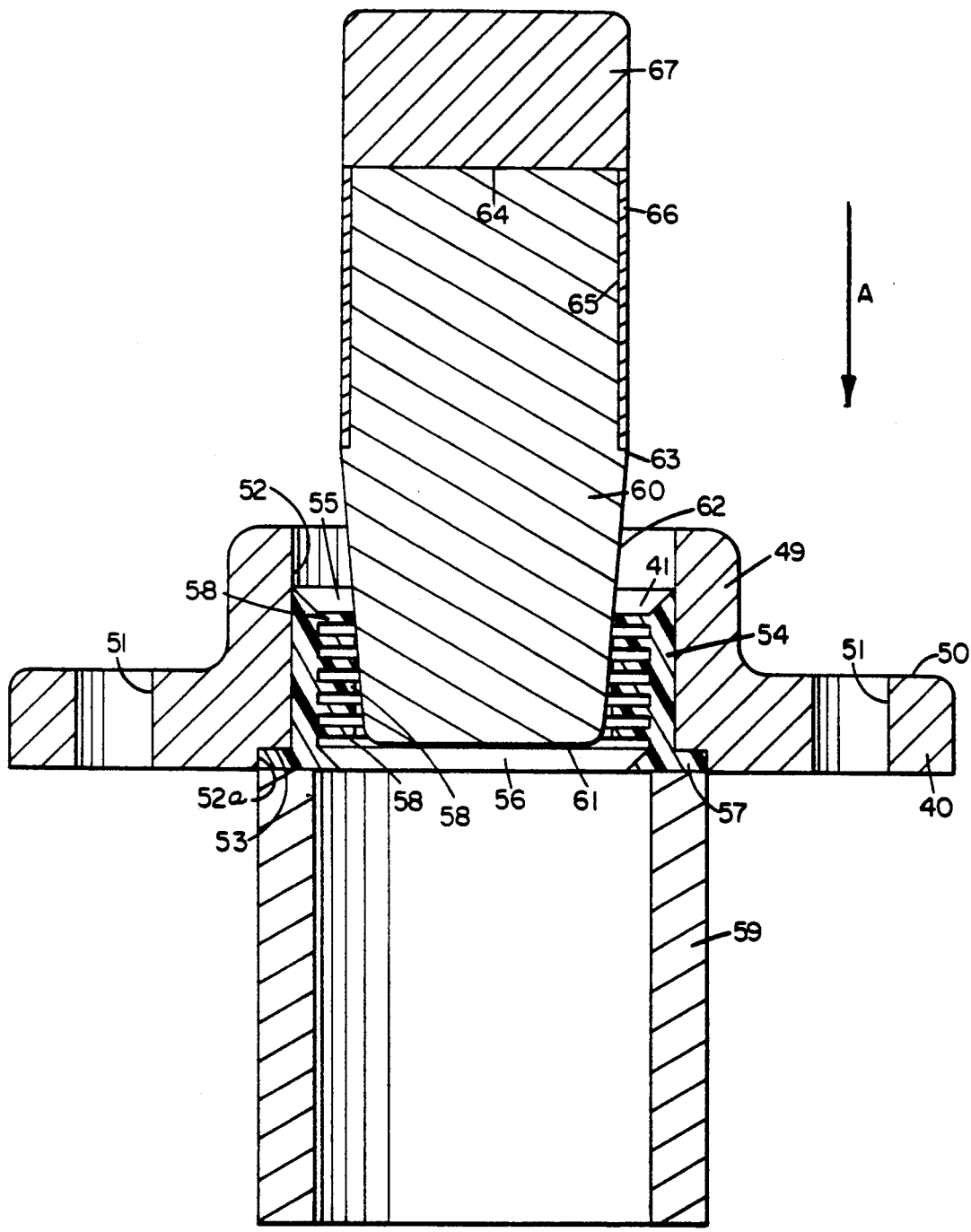
FIG. 4 is a cross-sectional elevational view illustrating the packing chamber and seal of FIG. 3 mounted on a cylindrical tool, together with a plunger die carrying a transfer tube.

Reference is now made to FIG. 4. The assembly of the packing chamber 40 and second seal 41 is caused to rest upon the upper end of a simple tool 59 comprising a hollow cylinder. It will be noted that the cylinder tool 59 is of such size that it supports both the body portion 54 of second seal 41 and the packing chamber 40 via seal flange 57. A plunger die 60 is inserted in the central bore of second seal 41, defined by annular lips 58. Plunger die 60 has a bottom surface 61 which rounds into an upwardly and outwardly tapered side portion 62. The plunger die 60 is of circular cross section throughout its length. The tapered side portion 62 terminates in a cylindrical side portion 63 having a diameter slightly larger than the diameter of actuating shaft 47. The plunger die 60 is provided with an upper end 64.

From a point near the junction of tapered side surface 62 and cylindrical side surface 63 of plunger die 60, the plunger die is provided with a reduced diameter 65 which extends to its upper end 64.

Plunger die 60 is preferably made of metal. The reduced diameter 65 receives a transfer tube 66. Transfer tube 66 may be made of metal or plastic. When mounted on the plunger die as shown in FIG. 4, the outside surface of transfer tube 66 is essentially coextensive with the cylindrical surface 63 of the plunger die, having a slightly larger diameter than the actuating shaft 47.

Figure 5:
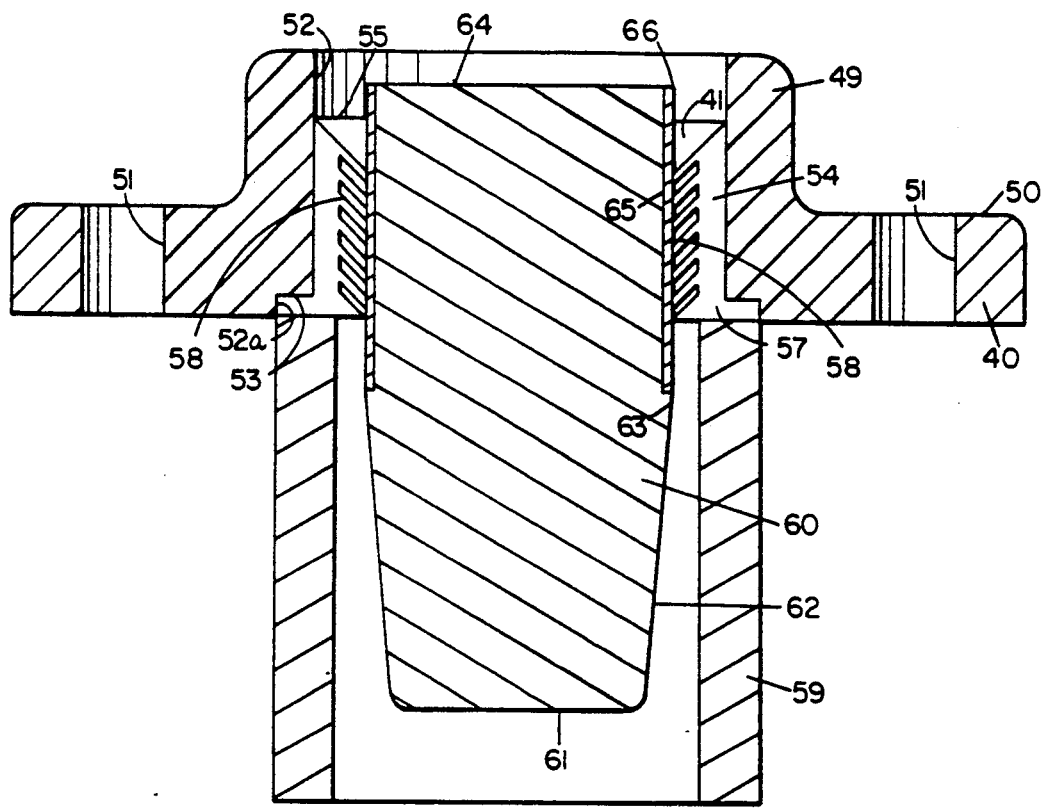
FIG. 5 is a cross-sectional elevational view similar to FIG. 4, but illustrating the plunger having been driven through the seal to the extent that the distorted seal lips engage the periphery of the transfer tube.

The plunger die 60 is preferably provided with a removable head 67. The removable head 67 is detachably affixed to the upper end 64 of plunger die 60 by any appropriate fastener means (not shown). The head 67 protects not only the upper end 64 of plunger die 60 but also the upper end of transfer tube 66. The head 67 further prevents axial shifting of the transfer tube 66 with respect to the plunger die 60. With the various elements arranged as illustrated in FIG. 4, the plunger die 60 is driven or shoved in the direction of arrow A until the second seal 41 is engaged on transfer tube 66, as shown in FIG. 5. At this point, the head 67 (if used) of the plunger die 60 is removed and the plunger die 60, itself, is withdrawn from transfer tube 66 and the packing chamber 40 is removed from cylinder tool 59. This leaves the structure illustrated in FIG. 6, comprising the packing chamber 40, the second seal 41 and the transfer tube 66. At this stage, the second seal 41 and the packing chamber 40 are ready to be mounted on actuating shaft 47 and valve body 2, respectively.

Figure 6:
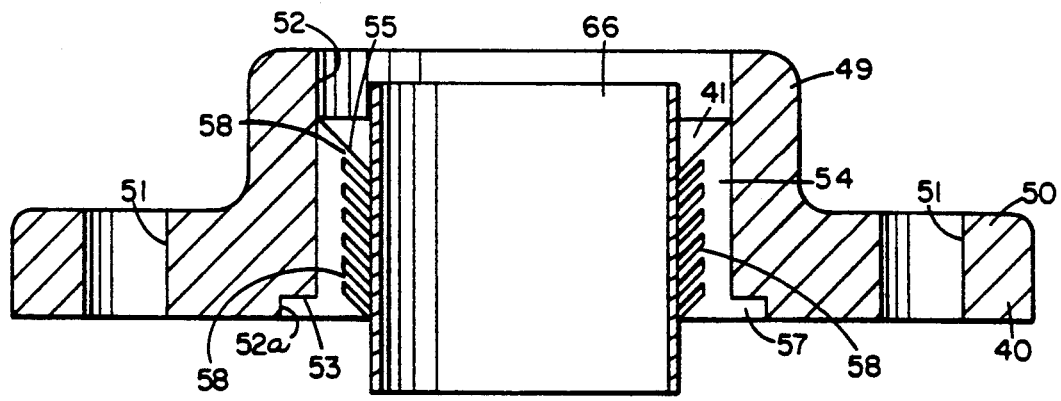
FIG. 6 is a cross-sectional elevational view similar to FIG. 3, but illustrating the transfer tube mounted in the seal.

Comparing FIG. 4 with FIGS. 5 and 6, it will be noted that the downward shifting of the plunger die 60 and transfer tube 66 causes distortion of the second seal lips 58, shifting them downwardly so that instead of being horizontal, the lips 58 are tapered forming an angle of about 45° to the horizontal.

Figure 7:
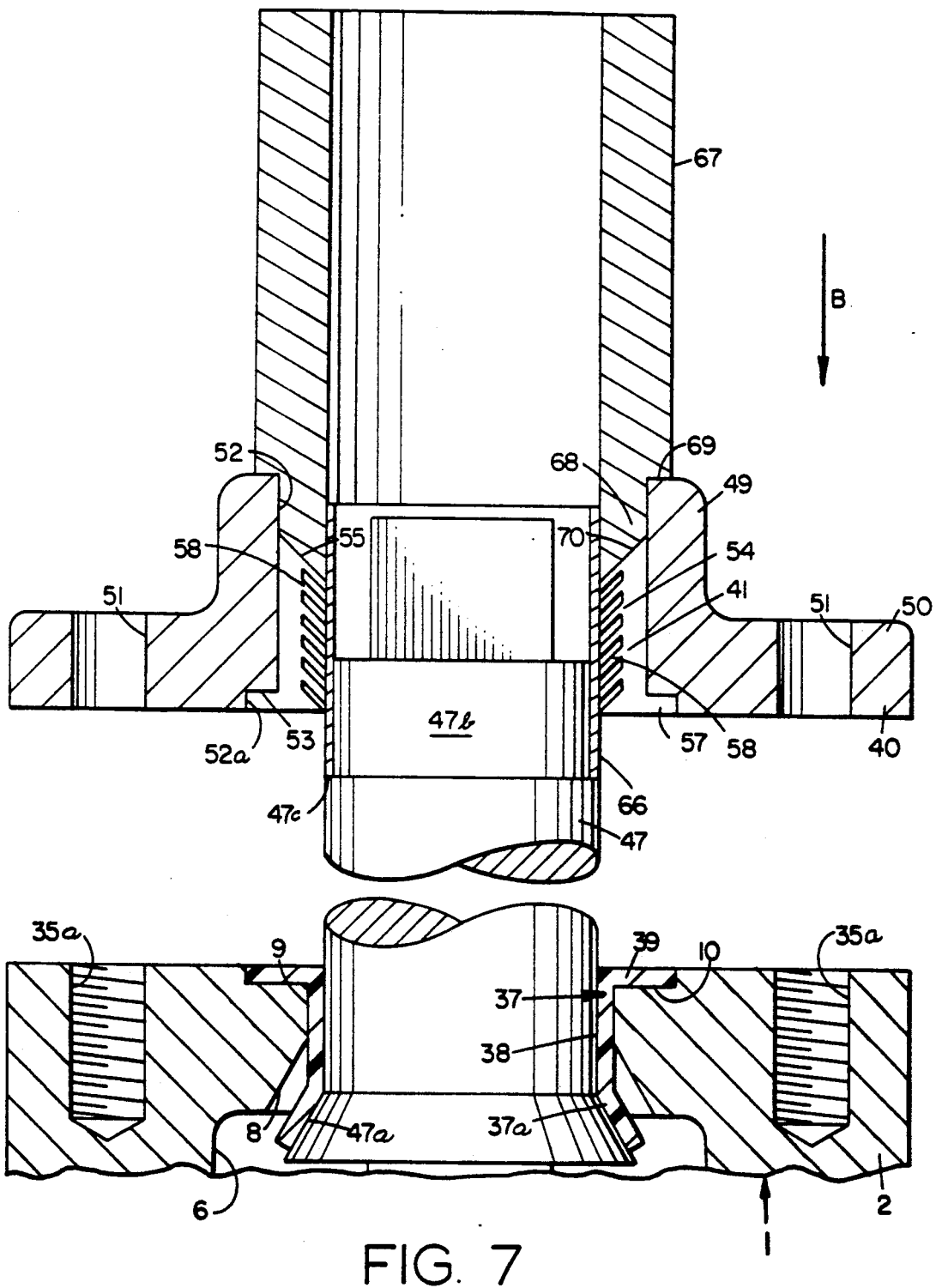
FIG. 7 is a fragmentary cross-sectional elevational view similar to FIG. 6, and illustrating the free end of the valve actuating shaft received within the transfer tube together with a cylindrical tool for driving the seal and packing chamber onto the shaft toward the valve body, to provide the completed structure of FIG. 2.

FIG. 7 illustrates the manner in which the assembly of FIG. 6 is mounted on actuating shaft 47 and valve body 2. To this end, a second cylindrical tool 67 is provided. The main portion of tool 67 has an outside diameter greater than the inside diameter of central bore 52 of packing housing 40. Tool 67 has an inside diameter sized to just nicely receive transfer tube 66. Near its lower end, tool 67 has a portion 68 having a reduced outside diameter so sized as to be just nicely received in the central bore 52 of packing housing 40. This forms a shoulder 69 which engages the upper end of the cylindrical body portion 49 of packing chamber 40. The lowermost end of cylindrical tool 67 (as viewed in FIG. 7) tapers inwardly and downwardly as at 70 at an angle of about 45° and is adapted to abut the surface 55 of second seal 41.

It will be remembered that the actuating shaft 47 has an upper portion 47b of reduced diameter forming a shoulder 47c. The outside diameter of actuating shaft portion 47b is sized to be received within transfer tube 66. It will be noted that the outside diameter of the main portion of actuating shaft 47 is coextensive with the slightly larger outside diameter of transfer tube 66.

The lower end of cylindrical tool 67 is inserted in the central bore 52 of packing housing 40 with its surface 70 abutting the surface 55 of second seal 41 and its shoulder 69 abutting the upper end of the packing chamber cylindrical body portion 49. Thereafter, the transfer tube is located on the smaller diameter portion 41b of actuating shaft 47, with the lower end of the transfer tube abutting actuating shaft annular shoulder 47c. The tool 67 is driven or shoved downwardly in the direction of arrow B. The lowermost tapered surface 70 of cylindrical tool 67 applies a downward force on the body portion 54 of second seal 41. The cylindrical tool shoulder 69 similarly applies a force to the cylindrical portion 49 of packing chamber 40 and the second seal flange 57. This causes the second seal 41 to shift downwardly off of the transfer tube 66 and onto the main body portion of actuating shaft 47 until flange 57 of second seal 41 abuts flange 39 of first seal 37. At the same time, the bottom surface of packing chamber 40 abuts or nearly abuts the upper surface of valve body 2, as is shown in FIG. 2.

When the second seal 41 is fully seated (as shown in FIG. 2) and the packing housing 40 lies adjacent valve body 2, the cylindrical tool 67 is removed from the packing housing and the transfer tube, no longer carrying the second seal 41, is removed from the actuating shaft 41.

At this point, the threaded members 44 are inserted through the bores 51 of the packing chamber and are threadedly engaged in the bores 35a of valve body 2. It will be remembered that the annular flange 39 of the first seal 37 is slightly thicker than the inset dimension of shoulder 10. Similarly, the flange 57 of second seal 41 is slightly thicker than the inset dimension of shoulder 53. When nuts 45 are threaded on threaded members 44 and tightened, the first seal flange 39 and the second seal flange 57 will be compressed and will form gasket seals with their respective shoulders 10 and 53. At the same time, the top of valve housing 2 will be abutted by the bottom of packing chamber 40 forming a metal-to-metal seal.

Continuing with FIG. 2, once the packing chamber 40 and second seal 41 have been bolted to the valve body 2, the follower ring 42 is placed over the actuating shaft 47 and into the central bore 52 of the cylindrical portion 49 of packing chamber 40. The follower ring 42 has a downwardly and inwardly sloping bottom surface 42a and an upwardly and inwardly sloping top surface 42b, so as to be substantially triangular in cross-section. The sloping bottom surface 42a of follower ring 42 lies at an angle of about 45° and abuts the upper surface 55 of second seal 41. The upper surface 42b of follower ring 42 also slopes at an angle of about 45°. The structure of FIG. 2 is completed by the provision of gland 43. The gland 43 comprises a cylindrical body 71 provided at its upper end (as viewed in FIG. 2) with a flange 72 containing a plurality of bores 73 to accommodate threaded members 44. The lowermost end of the cylindrical body portion 71 of gland 43 slopes upwardly and inwardly as at 74 at an angle of about 45°. The lowermost end of the cylindrical body portion 71 of gland 43 is inserted in the bore 52 of packing chamber 40 with the gland surface 74 abutting the upper surface 42b of follower ring 42. When the gland 43 is located in place, the nuts 46 are threadedly engaged on threaded members 44 and are tightened to snug the gland against follower ring 42, and follower ring against the body portion 54 of second seal 41. The gland 43 should not be tightened to the extent that it crushes the annular lips 58 of second seal 41.

It will be apparent from the above description and FIG. 2 that the first seal 37 will function in the manner described above. The second seal precludes leakage between itself and packing chamber 40 by virtue of the gasket seal formed between the flange 57 of the second seal and the annular shoulder 53 of packing chamber 40.

It will be remembered that the sealing lips 58 of second seal 41 have been distorted and stretched from a substantially horizontal position to a downwardly sloping tapered position (as viewed in FIG. 2) at an angularity of about 45°. As a result, the individual lips are urged into a tension-related association with actuating shaft 47. Thus, there is a plurality of sealing surfaces in tension on the shaft. The individual lips 58 are additionally urged in sealing relationship against the actuating shaft 47 by virtue of the memory of the material from which the second seal is made, this memory constantly urging the individual lips toward their original horizontal configuration.

It will be apparent from FIGS. 6, 7 and 2 that the slot between the lowermost lip 58 and the inclined lower surface 56 of second seal 41 is open to any leakage which might be present. As a result, fluid under pressure within this slot will urge the lowermost lip even tighter against the actuating shaft 47. Should the pressurized leakage enter others of the slots between the lips 58 of second seal 41, the pressurized fluid will assist in urging the adjacent lips against the actuating shaft 47.

From the above explanation, it will be apparent that both the first and second seals prevent leakage between themselves and the surrounding valve body 2 and packing chamber 40 by means of gasket seals. Leakage between the first and second seals 37 and 41 and the adjacent acuating shaft 47 is precluded by a tapered tension-related sealing contact between the seals and the shaft, this relationship being enhanced by the memory of the material from which the seals are made, and further enhanced by the pressure of the media.

Figure 8:
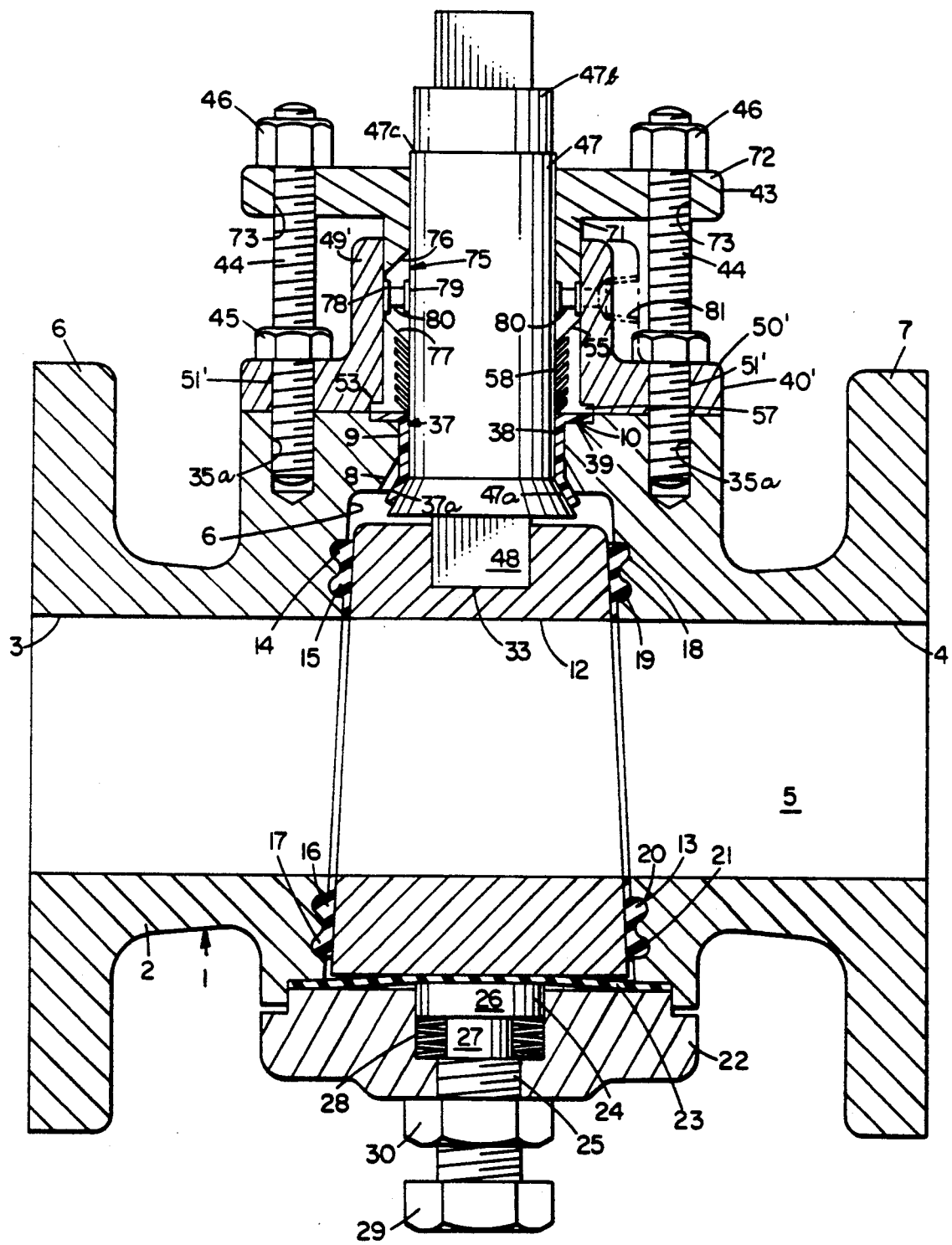
FIG. 8 is a cross-sectional elevational view illustrating the structure of FIG. 2 provided with a lantern gland.

In instances where leakage is extremely critical, the follower ring 42 of FIG. 2 can be replaced by a lantern gland. Such a lantern gland is illustrated in FIG. 8. Since substantially all of the remaining parts of FIG. 8 are identical to those of FIG. 7, like parts have been given like index numerals. The lantern gland is generally indicated at 75 and comprises a cylindrical body just nicely received between packing chamber 40' and actuating shaft 47. The lantern gland has an upper surface (as viewed in FIG. 8) which slopes upwardly and inwardly at about 45° and is in abutting relationship with the lowermost sloped surface 74 of gland 43. The lantern gland 75 has a lower surface (as viewed in FIG. 8) which slopes downwardly and inwardly at about 45° and is in abutting relationship with the uppermost surface 55 of second seal 41. The inner and outer surfaces of lantern gland 75 are provided with annular grooves 78 and 79, respectively. The grooves 78 and 79 are joined together by a plurality of evenly spaced passages, two of which are shown at 80.

The packing chamber 40' differs from packing chamber 40 of FIG. 2 only in that its cylindrical body portion 49' is slightly longer, to accommodate the lantern gland, and is provided with an inlet 81 communicating with the exterior slot 78 of lantern gland 75. The inlet 81 is internally threaded and is adapted to receive a fitting connected to a source of inert fluid (liquid or gas) having a pressure equal to or greater than the pressure of the flow of media through valve 1. This assures that there cannot be any leakage of media. The use of a lantern gland, per se, is well-known in the art.

Modifications may be made in the invention without departing from the spirit of it. For example, while the second seal is described as used in conjunction with the first seal, it will be appreciated by one skilled in the art that the second seal could be used alone. Under these circumstances, the first seal 37 would be eliminated and a simple bushing substituted therefore. Alternatively, the valve passage 9 could be made of such diameter as to just nicely receive the main body portion of actuating shaft 47. Furthermore, the shoulder 10 of the valve body 2 would be eliminated and the top surface of the valve body would be made co-planar throughout, so as to be abutted by the flange 57 of second seal 41. When used alone, or in conjunction with a lantern gland, the second seal 1 would function in the same manner described above.

As used herein and in the claims, such words as "top", "bottom", "horizontal", "upper", "lower", "upwardly", "downwardly", and the like are used in conjunction with the drawings for purposes of clarity. It will be understood by one skilled in the art that the valve 1 could be mounted and used in any orientation required by the piping of which it forms a part.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A seal for a rotary shaft in a structural body, said seal being made of a non-elastomeric memory retainable perfluoroalkoxy side chain modified fluorocarbon polymer material, said seal being configured to surround said shaft within said structural body and to make a gasket seal with said structural body, said seal having at least one portion that is distorted and stretched from a first non-stretched configuration into a tapered configuration along and by a tapered portion of the shaft as the shaft engages and is moved axially relative to said seal, the stretching and distorting of said at least one portion of the seal putting the at least one portion into tension-related sealing association with the tapered portion of the shaft, the tension-related sealing between the stretched tapered portion of the seal and the tapered portion of the shaft being enhanced by the memory retainable characteristics of the seal material, which memory retainable characteristics tend to urge the stretched tapered portion of the seal back toward its first non-stretched configuration.

2. The seal claimed in claim 1 wherein said seal is made of a fluorinated hydrocarbon polymer.

3. The seal claimed in claim 1 wherein said seal is made of polytetrafluoroethylene.

4. The seal claimed in claim 1 comprising a cylindrical member having first and second ends, said seal having an external peripheral flange at its second end, said structural body having a bore with first and second ends, said second end of said bore terminating in a portion of enlarged diameter forming a shoulder, said seal being receivable within said bore with minimum clearance and with said seal flange within said enlarged diameter bore portion abutting said shoulder, means clamping said seal flange against said shoulder to form said gasket seal between said seal and said structural body, said first end of said seal extending beyond said first end of said structural body bore, said shaft having a body with first and second ends, said body being of cylindrical configuration throughout the majority of its length, said shaft body tapering outwardly adjacent its first end, said shaft being mounted within said seal with minimum clearance, said tapered portion of said shaft entering said seal first end causing a portion of said seal adjacent said first end thereof and beyond the first end of said structural body bore to assume a corresponding taper, said tapered seal portion comprising said portion distorted and stretched into a tension-related sealing association with said shaft, said sealing association being enhanced by said memory urging said seal tapered portion toward its original cylindrical configuration.

5. The seal claimed in claim 4 wherein said seal is made of a fluorinated hydrocarbon polymer.

6. The seal claimed in claim 4 wherein said seal is made of polytetrafluoroethylene.

7. The seal claimed in claim 4 including fluid under pressure within said structural body, said fluid acting upon the exterior surface of said tapered portion of said seal to enhance said sealing association with said shaft.

8. The seal claimed in claim 4 wherein said structural body comprises the body of a plug valve, said valve body having an inlet and an outlet with a fluid passage therebetween, a valve chamber intermediate said inlet and outlet and extending transversely of and intersecting said fluid passage, a plug rotatively mounted in said valve chamber, said plug having a through passage therein, said plug being rotatable between a position wherein said through passage of said plug is in registry with valve body fluid passage to permit flow of fluid under pressure from said inlet to said outlet, and a position wherein said through passage of said plug is out of registry with said valve body fluid passage preventing flow of fluid under pressure from said inlet to said outlet, said first end of said structural body bore communicating with said valve chamber, the second end of said last mentioned bore opening exteriorly of said valve body, means to rotate said plug comprising said shaft, said first end of said shaft being operatively connected to said plug, said second shaft end being located exteriorly of said valve body for engagement by an actuating means.

9. The seal claimed in claim 8 wherein said means to clamp said seal flange against said shoulder comprises a closure plate affixed to said valve body and having a bore through which said shaft extends.

10. The seal claimed in claim 8 wherein said seal is made of a fluorinated hydrocarbon polymer.

11. The seal claimed in claim 8 wherein said seal is made of polytetrafluoroethylene.

12. The seal claimed in claim 10 wherein said seal is made of a fluorinated hydrocarbon polymer.

13. The seal claimed in claim 10 wherein said seal is made of polytetrafluoroethylene.

14. The seal claimed in claim 4 wherein said structural body comprises the body of a plug valve, said valve body having an inlet and an outlet with a fluid passage therebetween, a valve chamber intermediate said inlet and outlet and extending transversely of and intersecting said fluid passage, a plug rotatively mounted in said valve chamber, said plug having a through passage therein, said plug being rotatable between a position wherein said through passage of said plug is in registry with valve body fluid passage to permit flow of fluid under pressure from said inlet to said outlet, and a position wherein said through passage of said plug is out of registry with said valve body fluid passage preventing flow of fluid under pressure from said inlet to said outlet, said first end of said structural body bore containing said tapered seal communicating with said valve chamber, the second end of said last mentioned bore opening exteriorly of said valve body, means to rotate said plug comprising said shaft, said first end of said shaft being operatively connected to said plug, said shaft extending through said structural body bore and said tapered seal therein, a cylindrical packing chamber mountable on said valve body, said packing chamber having a bore containing a second seal, said second seal comprising a cylindrical body having cylindrical inner and outer walls and first and second ends, said second seal terminating at its first end in a tapered surface extending inwardly and toward said second end at an angle of about 45°, an annular interior flange similarly tapered at about 45° being formed on said inner wall at said second seal second end, an exterior annular flange being formed on said outer wall at said second seal second end, a plurality of thin annular interior flanges extending from said inner wall and being evenly spaced therealong and parallel to each other, said thin interior flanges being initially perpendicular to the axis of said cylindrical inner wall, said thin interior flanges having annular free edges defining a central bore of lesser diameter than said shaft, said packing chamber bore having first and second ends, said first end of said packing chamber bore terminating in a portion of enlarged diameter forming a shoulder, said second seal being receivable within said packing chamber bore with said second seal exterior flange within said enlarged diameter bore portion abutting said shoulder, said shaft extending through said second seal and distorting and stretching said thin flanges into a tapered configuration substantially parallel with said tapered surface and said tapered flange and into a tension-related sealing association with said shaft, said sealing association with said shaft being enhanced by said seal memory urging said thin flanges to their original configuration, said enlarged diameter portion of said packing chamber and said second seal flange therein overlying said enlarged diameter portion of said structural body bore and said tapered seal flange therein, said packing chamber when attached to said valve body clamping said exterior flanges of said seals to their respective shoulders to form gasket seals therebetween.

15. The seal claimed in claim 14 wherein said seal is made of a fluorinated hydrocarbon polymer.

16. The seal claimed in claim 14 wherein said seal is made of polytetrafluoroethylene.

17. The seal claimed in claim 14 wherein said shaft extends beyond said packing chamber for engagement by actuating means, a follower ring within said packing chamber bore about said shaft and being configured to engage said second end of said cylindrical body of said second seal, and a gland having a cylindrical portion within said packing chamber bore surrounding said shaft and engaging said follower ring, said gland having an exterior flange beyond said packing chamber and means operatively attaching said gland flange to said valve body.

18. The seal claimed in claim 14 wherein said shaft extends beyond said packing chamber for engagement by actuating means, a lantern gland within said packing chamber bore about said shaft and being configured to engage said second end of said cylindrical body of said second seal, and a second gland having a cylindrical portion within said packing chamber bore surrounding said shaft and engaging said lantern gland, said second gland having an exterior flange beyond said packing chamber and means operatively attaching said second gland flange to said valve body, said lantern gland comprising an annular body having an exterior annular notch facing said packing chamber interior wall and an interior annular notch facing said shaft, a plurality of evenly spaced radial bores in said lantern gland body joining said exterior and interior annular notches, said packing chamber having a transverse bore communicating with said exterior lantern gland notch, said transverse bore being connected to a source of inert fluid under equal or greater pressure than the pressure of said fluid in said valve body.

19. The seal claimed in claim 17 wherein said seals are made of a fluorinated hydrocarbon polymer.

20. The seal claimed in claim 17 wherein said seals are made of polytetrafluoroethylene.

21. The seal claimed in claim 18 wherein said seals are made of a fluorinated hydrocarbon polymer.

22. The seal claimed in claim 18 wherein said seals are made of polytetrafluoroethylene.

23. A seal as recited in claim 1 wherein said at least one portion includes a plurality of thin spaced annular interior flanges extending radially inwardly from an inner wall of the seal, said thin interior flanges being initially oriented perpendicular to the axis of the shaft and having annular free edges defining a central bore of lesser diameter than said shaft, said shaft extending through said central bore and distorting and stretching said thin flanges to an oblique orientation with respect to the axis of said shaft so that the flanges are in a tension-related sealing association with said shaft.

24. A seal as recited in claim 23 wherein said flanges are substantially parallel to each other in both the initial and oblique orientations with respect to the shaft axis.

25. A seal for a rotary shaft in a structural body, said seal being made of a non-elastomeric memory retainable perfluoroalkoxy side chain modified fluorocarbon polymer material, said seal being configured to surround said shaft within said structural body and to make a gasket seal with said structural body, said seal having a plurality of spaced sealing lips in generally parallel relationship that are initially distorted and stretched from a first non-stretched configuration in which the lips extend radially inwardly in generally perpendicular relationship to the shaft into a tapered configuration in which the lips generally retain the relative spacing but extend in oblique angled relationship to the shaft by relative axial movement between said seal and a removable installation member, the seal being maintained in said tapered configuration by engagement with the shaft, the stretching and distorting of said at least one portion of the seal putting the at least one portion lips into tension-related sealing association with the shaft, the tension-related sealing between the stretched tapered portion of the seal and the shaft being enhanced by the memory retainable characteristics of the seal material, which memory retainable characteristics tend to urge the stretched tapered portion of the seal back toward its first non-stretched configuration.

26. The seal claimed in claim 25 wherein said seal is made of polytetrafluoroethylene.

27. The seal claimed in claim 25 comprising a cylindrical member having cylindrical inner and outer walls and first and second ends, said cylindrical seal terminating at its first end in a tapered surface extending inwardly and toward said second end of an angel of about 45°, an annular interior flange similarly tapered at about 45° being formed on said inner wall at said seal second end, an exterior annular flange being formed on said outer wall at said seal second end, a plurality of thin annular interior flanges extending from said inner wall and being evenly spaced there along and parallel to each other, said thin interior flanges being initially perpendicular to the axis of said cylindrical inner wall, said thin interior flanges having annular free edges defining a central bore of lesser diameter than said shaft, said shaft extending through said seal and distorting and stretching said thin flanges into a tapered configuration in substantial parallelism with said tapered surface and said tapered flange and into a tension-related sealing association with said shaft, said sealing association with said shaft being enhanced by said seal memory urging said thin flanges to their original configuration, said structural body having a bore with first and second ends, said first end of said bore terminating in a portion of enlarged diameter forming a shoulder, said seal being receivable within said bore with minimum clearance and with said seal exterior flange within said enlarged diameter bore portion abutting said shoulder, means clamping said seal exterior flange against said shoulder to form said gasket seal.

28. The seal claimed in claim 26 wherein said structural body comprises the body of a plug valve, said valve body having an inlet and an outlet with a fluid passage therebetween, a valve chamber intermediate said inlet and outlet and extending transversely of and intersecting said fluid passage, a plug rotatively mounted in said valve chamber, said plug having a through passage therein, said plug being rotatable between a position wherein said through passage of said plug is in registry with valve body fluid passage to permit flow of fluid under pressure from said inlet to said outlet, and a position wherein said through passage of said plug is out of registry with said valve body fluid passage preventing flow of fluid under pressure from said inlet to said outlet, said first end of said structural body bore communicating with said valve chamber, the second end of said last mentioned bore opening exteriorly of said valve body, means to rotate said plug comprising said shaft, said first end of said shaft being operatively connected to said plug, said second shaft end being located exteriorly of said valve body for engagement by an actuating means.

29. The seal claimed in claim 27 wherein said structural body comprises the body of a plug valve, said valve body having an inlet and an outlet with a fluid passage therebetween, a valve chamber intermediate said inlet and outlet and extending transversely of and intersecting said fluid passage, a plug rotatively mounted in said valve chamber, said plug having a through passage therein, said plug being rotatable between a position wherein said through passage of said plug is in registry with valve body fluid passage to permit flow of fluid under pressure from said inlet to said outlet, and a position wherein said through passage of said plug is out of registry with said valve body fluid passage preventing flow of fluid under pressure from said inlet to said outlet, said valve body having a bore extending from said valve chamber to the exterior of said valve body, said structural body including a cylindrical packing chamber mountable on said valve body, said packing chamber having said bore containing said seal, said packing chamber bore being coaxial with said valve body bore and said seal external flange being clamped between said valve body and said shoulder to form said gasket seal when said packing chamber is mounted on said valve body, means to rotate said plug comprising said shaft, said first end of said shaft being operatively connected to said plug, said shaft extending through said valve body bore and said seal in said packing chamber bore, said second end of said shaft being located beyond said packing chamber for engagement by an actuating means, a follower ring within said packing chamber bore about said shaft and being configured to engage the second end of said cylindrical body of said seal, and a gland having a cylindrical portion within said packing chamber bore surrounding said shaft and engaging said follower ring, said gland having an exterior flange beyond said packing chamber and means operatively attaching said gland flange to said valve body.

* * * * *